(12) United States Patent
Carteri et al.

(10) Patent No.: US 10,831,848 B2
(45) Date of Patent: *Nov. 10, 2020

(54) MANAGEMENT OF SOFTWARE APPLICATIONS BASED ON SOCIAL ACTIVITIES RELATING THERETO

(71) Applicant: International Business Machines Corporation, Armonk, NY (US)

(72) Inventors: Francesco M. Carteri, Rome (IT); Giorgio Corsetti, Rome (IT); Massimo Marra, Rome (IT); Andrea Tortosa, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/434,439

(22) Filed: Jun. 7, 2019

(65) Prior Publication Data
US 2019/0286485 A1    Sep. 19, 2019

Related U.S. Application Data

(63) Continuation of application No. 15/343,345, filed on Nov. 4, 2016, now Pat. No. 10,409,647.

(51) Int. Cl.
*G06F 9/50* (2006.01)
*G06F 16/9535* (2019.01)
(Continued)

(52) U.S. Cl.
CPC .......... *G06F 16/9535* (2019.01); *G06F 9/505* (2013.01); *G06F 9/5083* (2013.01);
(Continued)

(58) Field of Classification Search
CPC .... G06F 9/505; G06F 9/5083; G06F 16/9535; G06F 16/245; H04L 67/22; H04W 4/21
See application file for complete search history.

(56) References Cited

U.S. PATENT DOCUMENTS

| 7,743,001 B1 | 6/2010 | Vermeulen et al. |
| 8,694,401 B2 | 4/2014 | Stewart |

(Continued)

OTHER PUBLICATIONS

List of IBM Patents or Patent Applications Treated as Related, Jun. 13, 2019, pp. 1-2.
(Continued)

*Primary Examiner* — Duy Khuong Nguyen
*Assistant Examiner* — Kevin X Lu
(74) *Attorney, Agent, or Firm* — Winstead PC

(57) ABSTRACT

A computer-implemented method, system and computer program product for managing a software application. Load information indicative of a workload over time of one or more computing resources being used by the software application is monitored. Furthermore, social information indicative of a social activity over time relating to the software application is monitored. An estimated correlation between the monitored load information and the monitored social information is determined. A future requirement of the computing resources for the software application is then forecasted according to the monitored social information and the estimated correlation for use in provisioning the computing resources to the software application accordingly.

10 Claims, 6 Drawing Sheets

(51) Int. Cl.
*H04L 29/08* (2006.01)
*H04W 4/21* (2018.01)
*G06F 16/245* (2019.01)

(52) U.S. Cl.
CPC ............ *G06F 16/245* (2019.01); *H04L 67/22* (2013.01); *H04W 4/21* (2018.02)

(56) References Cited

U.S. PATENT DOCUMENTS

| | | |
|---|---|---|
| 2010/0049852 A1 | 2/2010 | Whitnah et al. |
| 2012/0296845 A1* | 11/2012 | Andrews ................ G06Q 40/06 705/36 R |
| 2014/0114901 A1 | 4/2014 | Pradhan et al. |
| 2014/0279684 A1 | 9/2014 | Liao et al. |
| 2015/0149153 A1 | 5/2015 | Werth et al. |
| 2015/0180719 A1 | 6/2015 | Wu et al. |
| 2015/0206074 A1 | 7/2015 | Miller |
| 2015/0227517 A1 | 8/2015 | Lymberopoulos et al. |
| 2016/0019659 A1 | 1/2016 | Doganata et al. |
| 2017/0250939 A1 | 8/2017 | Bohm et al. |

OTHER PUBLICATIONS

Stephen Dann, "Maximizing Commerce and Marketing Strategies through Micro-Blogging," http://www.igi-global.com/chapter/benchmarking-micro-blog-performance/131038, 2015, pp. 1-20, see Abstract.

Canali et al., "Impact of Social Networking Services on the Performance and Scalability of Web Server Infrastructures," Proceedings of the Seventh IEEE International Symposium on Networking Computing and Applications, NCA 2008, Jul. 10-12, 2008, Cambridge, Massachusetts, USA, pp. 1-8.

Turban et al., "Strategy and Performance Management in Social Commerce," http://link.springer.com/chapter/10.1007/978-3-319-17028-2_10, chapter in book entitled "Social Commerce," 2016, pp. 233-263, see Abstract.

Wang et al., "Propagation Based Social-Aware Replication for Social Video Contents," MM'12, Nara, Japan, Oct. 29-Nov. 2, 2012, pp. 29-38.

* cited by examiner

MANAGEMENT OF SOFTWARE APPLICATIONS BASED ON SOCIAL ACTIVITIES RELATING THERETO

TECHNICAL FIELD

The present invention relates generally to the information technology field, and more particularly to the management of software applications.

BACKGROUND

Software applications often operate in dynamic environments, wherein their workload is variable over time, in a way that is not known a priori. Therefore, computing resources required by each software application for its running (for example, processing power, mass memory space) are generally provisioned thereto so as to meet the workload of the software application in standard (i.e., average) operative conditions (with a certain safety margin). However, this results in an over-provisioning of the computing resources for most of the time, during which the computing resources in excess remain unused (with a corresponding waste thereof). In any case, the computing resources may be under-provisioned when high peaks of the workload occur; in this case, the software application may be unable to absorb its extra-demand, with a consequent degradation of performance of the software application, down to its complete out of service, which may be unacceptable in many practical situations. For example, an e-commerce web site may appear very slow or even unreachable, with a corresponding significant loss of business; moreover, the performance degradation or the out of service may cause a breach of a corresponding Service Level Agreement (SLA).

Performance monitors are available for monitoring performance of the software applications (by measuring corresponding metrics over time). In this way, as soon as the measured metrics indicate that any problem may be experienced by the software application, appropriate provisioning actions may be taken to remedy the situation (for allocation or releasing the computing resources assigned to the software application). A typical application is in a cloud computing environment, wherein (shared) computing resources, generally of virtual type, may be provisioned on-demand (with their implementation that is completely concealed). For example, a software application normally runs on a virtual machine. When a peak of its workload occurs, a corresponding overload of the virtual machine is detected (for example, a too high consumption of its processing power); in response thereto, an additional virtual machine is allocated to the software application so as to serve its increased demand responsively; as soon as the workload returns to its normal level, this additional virtual machine (now mostly idle) is released. This provides a certain degree of elasticity, since the software application is now able to adapt to the variation of its workload (by allocating and releasing the required computing resources accordingly).

However, the provisioning actions may only be performed after corresponding conditions in the workload of the software application have been detected; moreover, a certain time is required by these provisioning actions to take effect (for example, for acquiring a new virtual machine and configuring it appropriately). In general, this causes a delay from each workload condition requiring an adaptation of the computing resources assigned to the software application and the corresponding actual allocation/release of these computing resources, during which the software application may not match its demand correctly (i.e., its computing resources are over-provisioned or under-provisioned).

Moreover, with reference to search portals in the Internet, US-A-2015/0227517 discloses a trend response management. One example can detect a trending topic (e.g., event) and identify content associated with the trending topic. The example can take an action relating to the content that decreases a trend-induced processing spike and/or enhances a user search experience associated with the trending topic. For instance, the action can entail pushing the content to selected users, among other things.

SUMMARY

In one embodiment of the present invention, a computer-implemented method for managing a software application comprises monitoring load information of each software module of the software application indicative of a workload over time of one or more computing resources being used by the software application. The method further comprises monitoring social information indicative of a social activity over time relating to the software application. The method additionally comprises determining an estimated correlation between the monitored load information and the monitored social information. Furthermore, the method comprises forecasting a future requirement of the computing resources for the software application according to the monitored social information and the estimated correlation for use in provisioning the computing resources to the software application accordingly. Additionally, the method comprises provisioning the computing resources to the software application according to the future requirement thereof. Furthermore, the monitoring of social information comprises collecting social messages shared among persons over time, identifying each relevant one of the social messages relating to the software application, determining a polarity of each relevant social message indicative of an attitude of an originator of the relevant social message with respect to the software application, identifying each relevant social message being forwarded, identifying an opinion assigned to each relevant social message, and calculating the social information according to the relevant social messages, the polarities of the relevant social messages, the forwarding of the relevant social messages, and the opinions of the relevant social messages. Additionally, the determining of the estimated correlation comprises identifying one or more peak conditions in the monitored load information, and determining a mapping between each peak condition and a corresponding stirring event in the monitored social information. Furthermore, the forecasting of the future requirement comprises setting the future requirement of each computing resource according to the corresponding peak condition and restoring the future requirement of the computing resource in response to a start and to an end, respectively, of each stirring event according to the corresponding mapping.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

With reference in particular to FIGS. 1A-1D, the general principles are shown of the solution according to an embodiment of the present disclosure.

Figure 1A:
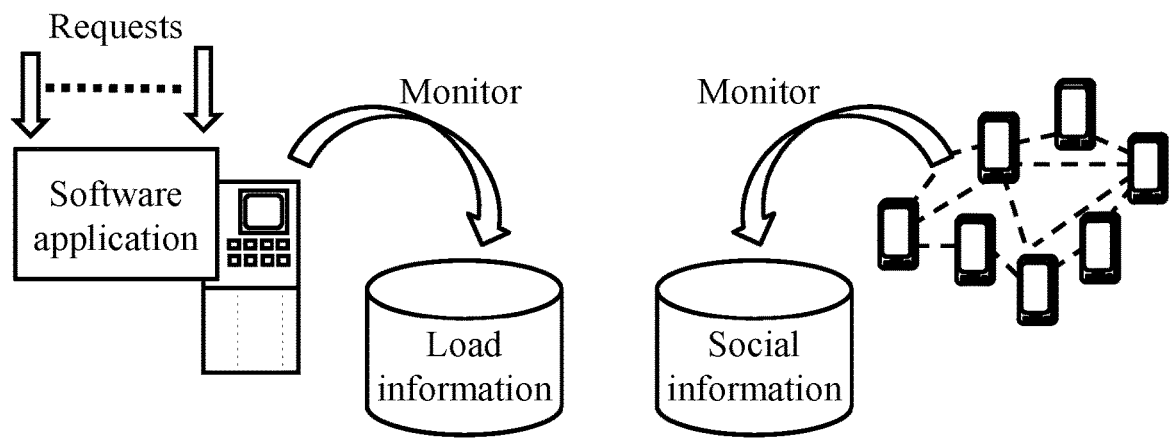
FIGS. 1A-1D show the general principles of the solution according to an embodiment of the present disclosure.

Starting from FIG. 1A, a software application (for example, an e-commerce web site) runs on a computing system (for example, in a cloud computing environment), and then it uses corresponding computing resources (for example, processing power, mass memory space).

In the solution according to an embodiment of the present disclosure, load information is monitored over time; the load information indicates a workload of the computing resources that are used by the software application (for example, a usage of processing power by the software application when requests are submitted thereto by corresponding users). Social information is further monitored over time; the social information indicates a social activity that relates to the software application, i.e., having an affinity therewith (for example, social messages expressing a positive or negative attitude of persons with respect to the software application).

Figure 1B:
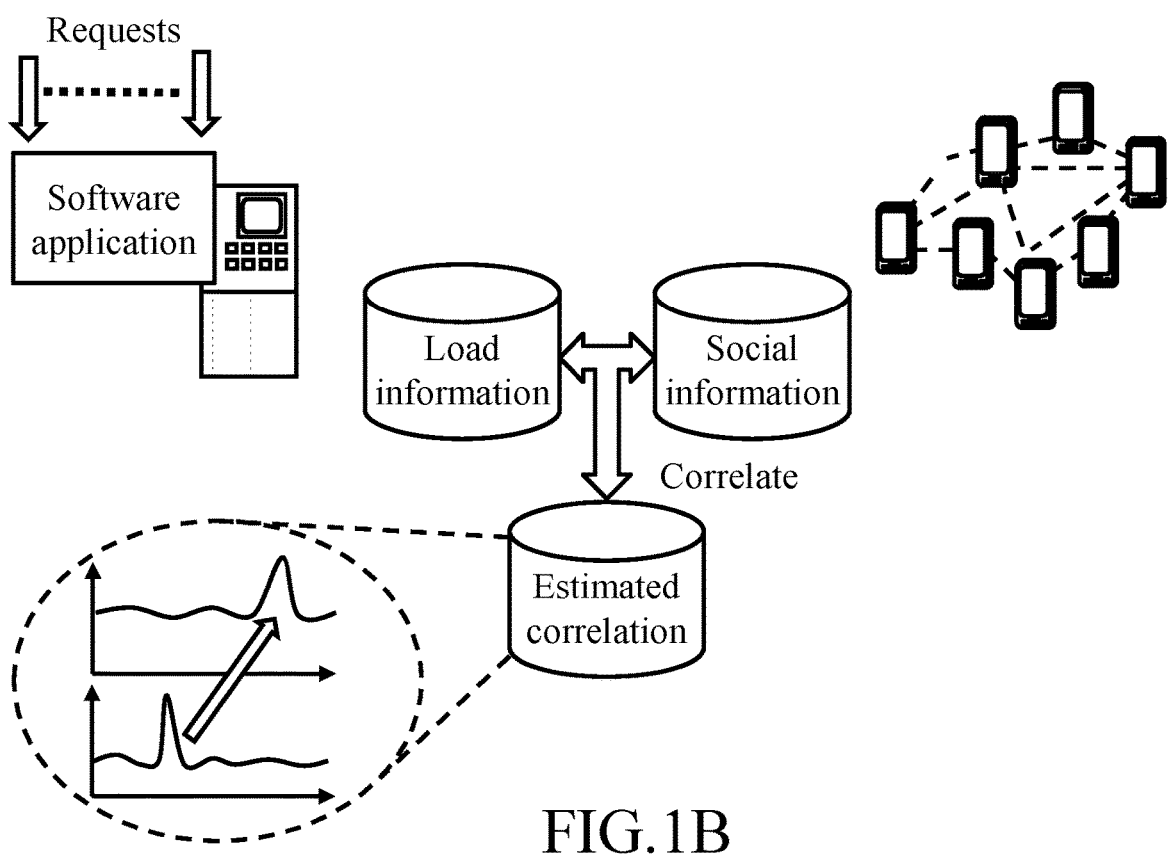

Moving to FIG. 1B, an estimated (or appraised) correlation is determined between the load information and the social information that has been monitored. For example, as shown in the figure, the estimated correlation may map a peak in the usage of the processing power by the software application to a high number of social messages expressing a positive attitude with respect to the software application that have been submitted one week before (such as about the launch of a new product that is sold by the e-commerce web site or a corresponding marketing campaign); indeed, in this case it is possible to infer that the high number of positive social messages preceded a corresponding high number of requests submitted to the software application the next week, which high number of requests in turn caused the peak in the usage of the processing power.

Figure 1C:
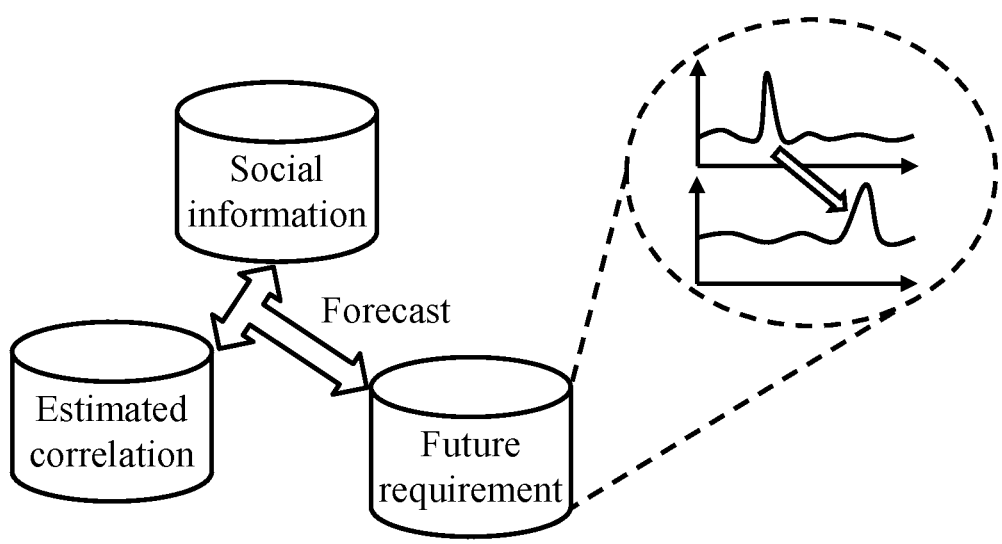

Moving to FIG. 1C, a future requirement of the computing resources for the software application is forecast according to the (monitored) social information and the estimated correlations. For example, as shown in the figure with reference to the above-mentioned case, when the same high number of positive social messages is detected it is likely that the same peak in the usage of the processing power will occur after one week.

Figure 1D:
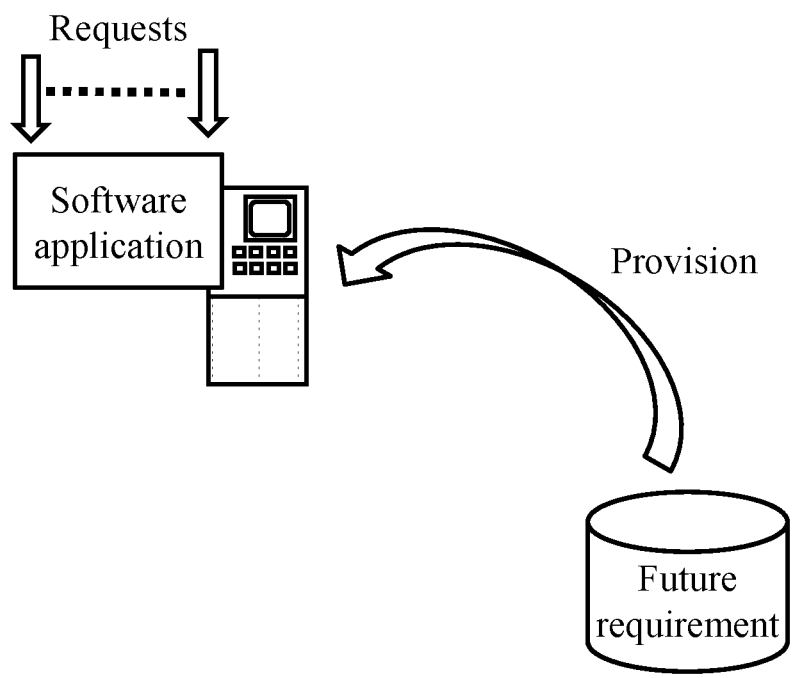

Moving to FIG. 1D, the future requirement of the computing resources for the software application that has been forecast is used for provisioning the computing resources to the software application accordingly (in an attempt to prevent similar situations that have occurred in the past). For example, with reference to the same case at issue, it is possible to increase the processing power that is available to the software application in the next week, so as to reduce its usage in spite of the high number of requests that are likely to be submitted to the software application.

In this way, a high degree of elasticity of the software application is obtained, since it may self-adapt to the variation of its workload (by allocating and releasing the required computing resources accordingly).

This result is achieved pro-actively, according to the future trend of the workload. Therefore, it is now possible to allocate/release the computing resources to the software application in advance; as a result, situations in which the software application does not match its demand correctly may be avoided (or at least substantially reduced), instead of just reacting to these situations (trying to adjust them) after they have already occurred.

All of the above allows having the computing resources that match the workload of the software application at any instant. For example, this may reduce any over-provisioning of the computing resources during which the computing resources in excess remain unused (with a corresponding saving thereof); at the same time, this may reduce the risk of any under-provisioning of the computing resources, so as to make the software application able to absorb high peaks of workload in most practical situations (with a beneficial effect on its service level).

This is particularly useful in dynamic environments, wherein the workload of the software application is variable over time in an unpredictable way.

Figure 2:
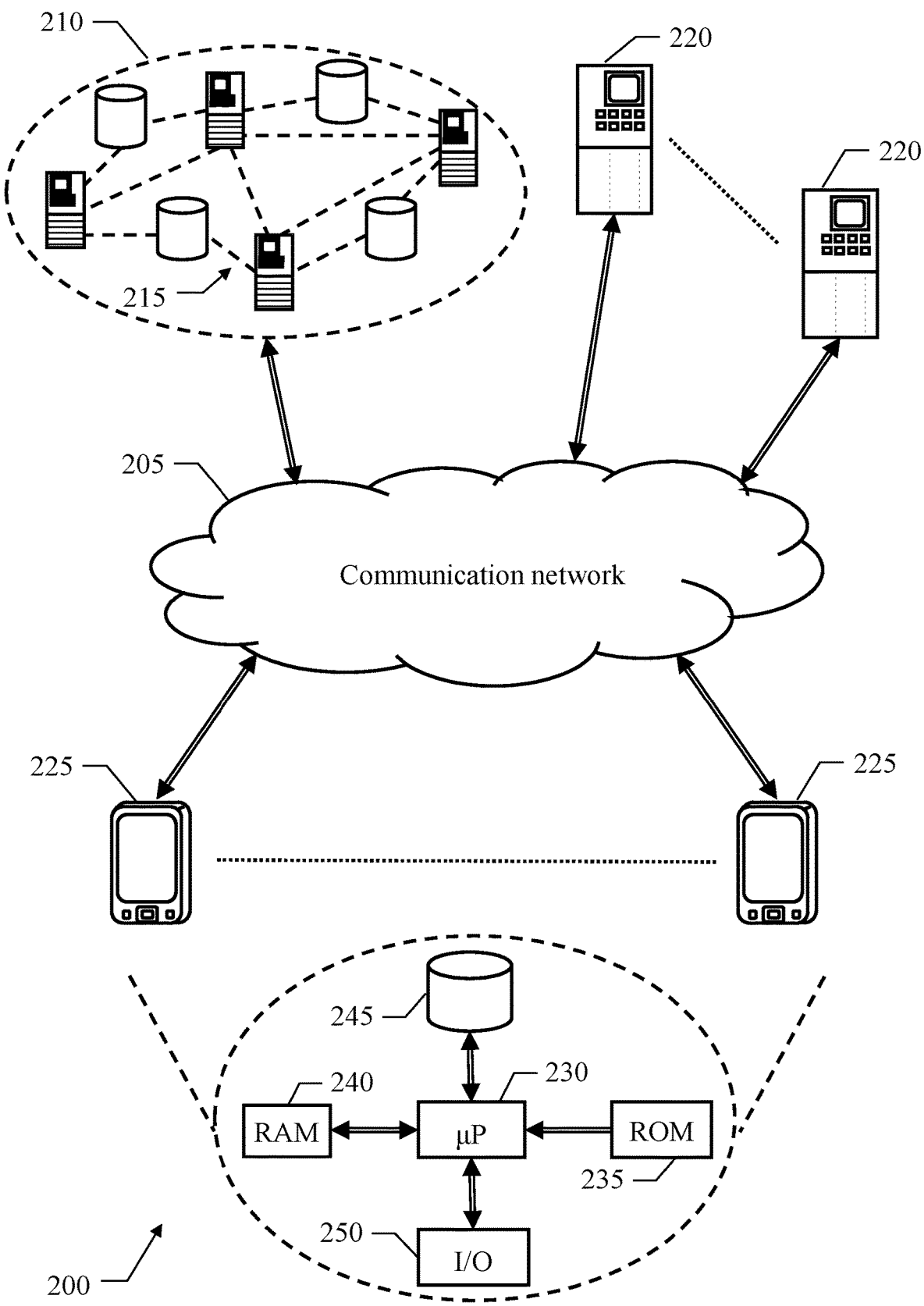
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 has a distributed architecture based on a global communication network 205 (for example, the Internet).

One or more cloud providers 210 (only one shown in the figure) are connected to the communication network 205. Each cloud provider 210 is an entity (generally implemented by server computing machines, or simply servers, of one or more data centers), which provides one or more cloud nodes 215 that are accessible through the communication network 205 (for example, for the general public in a public cloud deployment model). The cloud nodes 215 supply a pool of (hardware and/or software) computing resources as cloud services (i.e., shared computing resources that may be allocated, configured and released very rapidly and whose actual implementation is completely concealed); the computing resources of the cloud services (generally of the virtual type, i.e., emulations by software of physical resources) are supplied upon request by providing sole control of these computing resources, which may then be used exactly as if they were dedicated. The cloud services may be supplied according to several service models, particularly, Infrastructure as a Service, or IaaS (providing processing and storage resources with corresponding management software, such as virtual machines, virtual disks, firewalls, and the like), Platform as a Service, or PaaS (providing software platforms, such as databases, web servers, development tools, and the like), Software As a Service, or SAS (providing software applications, such as e-mails, CRMs, office suites, and the like), and Network as a service, or NaaS (providing connectivity services, such as VPNs, bandwidth availabilities, and the like). As far as relevant to the present disclosure, the cloud provider 210 makes available the cloud services implementing the computing resources that are used by one or more software applications (for example, virtual machines, virtual disks, software platforms); for example, the software applications may comprise e-commerce web sites each one running on one or more of the cloud nodes 215 for its access by customers thereof.

One or more additional servers 220 (generally implemented by one or more data centers as above) are further connected to the communication network 205. The servers 220 implement one or more social network services; the social network services are used to share information among persons having similar interests, activities or connections (for example, for maintaining contacts, building relations or exchanging information). Typically, the persons may submit social messages, forward social messages and assign their opinion to social messages; the shared information may be either private (i.e., accessible only by authorized people) or public (i.e., accessible by everyone).

Several users may access the cloud nodes 215 and the servers 220 (to use the software applications and the social network services, respectively) by connecting with corresponding client computing devices, or simply clients, 225 (for example, smart-phones) to the communication network 205. For example, the clients 205 are used to buy goods sold by e-commerce web sites, to submit or read information in the social network services.

Each computing machine of the computing infrastructure 200 (i.e., servers and clients) comprises several units that are connected among them (for example, through a communication bus and a cabling sub-system of their data center for the servers or through a communication bus for the clients). Particularly, one or more microprocessors (μP) 230 control operation of the computing machine; a non-volatile memory (ROM) 235 stores basic code for a bootstrap of the computing machine and a volatile memory (RAM) 240 is used as a working memory by the microprocessors 230. The computing machine is provided with a mass-memory 245 for storing programs and data (for example, storage devices of the data centers for the servers and flash memories for the clients). Moreover, the computing machine comprises a number of peripheral (or Input/Output, I/O) units 250; for example, the peripheral units 250 of the servers comprise a network interface card (NIC) for connecting to the communication network 205 (through a router sub-system of the data centers) and a drive for reading/writing removable storage units (like DVDs) implemented by a console of the data centers, whereas the peripheral units 250 of the clients comprise a mobile telephone transceiver (TX/RX) for communicating with a mobile telephone network (not shown in the figure), a Wireless Network Interface Card (WNIC) of the Wi-Fi type for communicating with access points to the communication network 205 (not shown in the figure) and a touch-screen for displaying information and entering commands.

Figure 3:
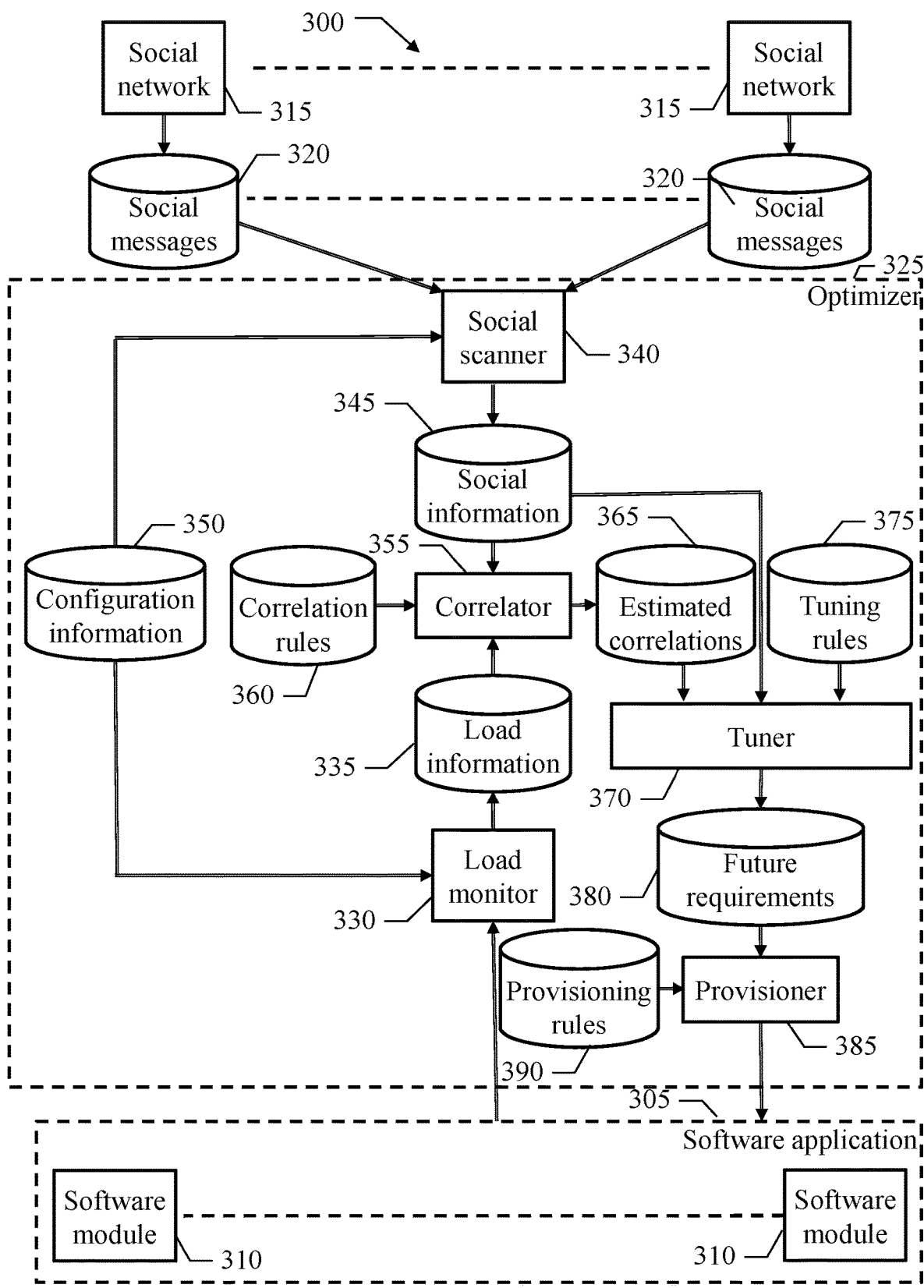
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least partially) into the working memory of each server when the programs are running, together with an operating system and other application programs (not shown in the figure). The programs are initially installed into the mass memory, for example, from removable storage units or from the communication network. In this respect, each program may be a module, segment or portion of code, which comprises one or more executable instructions for implementing the specified logical function.

Particularly, each software application (running on one or more cloud nodes, in turn implemented by one or more servers of the corresponding cloud provider) is denoted with the reference 305 (only one shown in the figure). The software application 305 generally has a modular architecture, wherein the software application 305 is separated into several (smaller) software modules 310 that implement different functions thereof; for example, the software modules 310 conform to the Representational State Transfer (REST or RESTful) specification, wherein each software module 310 exposes a corresponding REST Application Program Interface (REST API). In the above-mentioned case of the e-commerce web site, the software modules 310 may implement a querying function (for browsing a catalogue of the products that are sold), an ordering function (for buying the products) and a testing function (for running or downloading demos of the products).

The social network services (running on the corresponding servers) are denoted with the reference 315. Each social network service 315 controls (in read/write mode) a social message repository 320 storing the social messages that have been shared among its users (and any information relating thereto).

In the solution according to an embodiment of the present disclosure, an optimizer 325 controls the management of each software application 310 for optimizing the workload of the computing resources that are used by it, and then its performance (for example, running on a dedicated server of the cloud provider). Particularly, the optimizer 325 comprises the following components. A load monitor 330 monitors the load information of each software module 310 indicating the workload of the computing resources that are used by it. The load information may relate to consumption of the computing resources by the software module 310 (for example, usage of processing power, available working memory, available mass memory); in addition or in alternative, the load information may relate to performance of the software module 310 (for example, waiting time, execution time). For example, the load information comprises one or more load metrics, each one measuring the workload of a corresponding computing resource. The load monitor 330 controls (in write mode) a load information repository 335, which stores the load information of each software module 310 that has been monitored over time (for example, in the last 1-5 years). A social scanner 340 accesses (in read mode only) the social message repositories 320 for collecting the social messages that have been shared over time (by the users of the corresponding social network services 315) and that are publicly available. The social scanner 340 monitors the social information of each software module 310 (indicating the social activity relating to it) on the basis of these social messages; for example, the social information comprises a social score that is calculated from the (relevant) social messages relating to the software module 310 (such as according to their number, content and type). The social scanner 340 controls (in write mode) a social information repository 345, which stores the social information of each software module 310 that has been monitored over time (for example, again in the last 1-5 years). Both the load monitor 330 and the social scanner 340 access (in read mode) a configuration information repository 350, which stores configuration information of the software application 305 to be used for monitoring the load information and the service information. For example, the configuration information comprises an indication of the software modules 310 (for example, identified by their REST APIs); the configuration information comprises an indication of the computing resources that are used by each software module 310 and whose workload is to be monitored, and an indication of one or more scanning rules for identifying the relevant social messages relating to the software application 305 and to each software module 310 (for example, one or more metadata tags, or hashtags, that are used to label corresponding topics).

A correlator 355 determines each estimated correlation between the load information and the social information. The correlator 355 accesses (in read mode) the load information repository 335 and the social information repository 345; moreover, the correlator 355 accesses (in read mode) a correlation rule repository 360, which stores one or more correlation rules to be used for this purpose. For example, the correlation rules indicate a correlation mode for determining the estimated correlation for each load metric (of a corresponding computing resource of a software module 310); particularly, each correlation rule may indicate how to calculate a provisioning function (expressing the future requirement of the computing resource) from the social score of the software module (continuous correlation mode) or it may indicate how to identify any peak condition of the load metric and how to map it to a corresponding stirring event in the social score of the computing resource (discrete correlation mode). Therefore, the estimated correlation of each load metric is defined in the continuous correlation mode by the corresponding provisioning function (expressing the future requirement of the computing resource as a function of the social score and a time delay) and in the discrete correlation mode by the corresponding mapping (indicating the peak condition of the load metric that is caused in the future by each stirring event in the social score). The correlator 355 controls (in write mode) an estimated correlation repository 365, which stores the (current version) of the estimated correlation of each load metric of the software application 305.

A tuner 370 forecasts the future requirement of the computing resources used by the software application 305. The turner 370 accesses (in read mode) the social information repository 345 and the estimated correlation repository 365; moreover, the turner 370 accesses (in read mode) a tuning rule repository 375, which stores one or more tuning rules to be used for this purpose. For example, for each load metric (of a corresponding computing resource of a software module 310) the tuning rules indicates that the future requirement of its computing resource is defined by the corresponding provisioning function (continuous correlation mode) or it indicates how to calculate it from the corresponding peak condition (discrete correlation mode). The tuner 370 controls (in write mode) a future requirement repository 380, which stores the (current version) of the future requirements of the computing resources of the software application 305.

A provisioner 385 determines how to provision the computing resources used by the software application 305. The provisioner 385 accesses (in read mode) the future requirement repository 380; moreover, the provisioner 385 accesses (in read mode) a provisioning rule repository 390, which stores one or more provisioning rules to be used for this purpose. For example, for each computing resource the provisioning rules indicate the provisioning actions to be performed for meeting the corresponding future requirement (such has the number of virtual machines corresponding to the usage of the processing power). The provisioner 380 controls the execution of the provisioning actions (corresponding to the future requirements that apply at the moment) on the corresponding cloud provider.

Figure 4A:
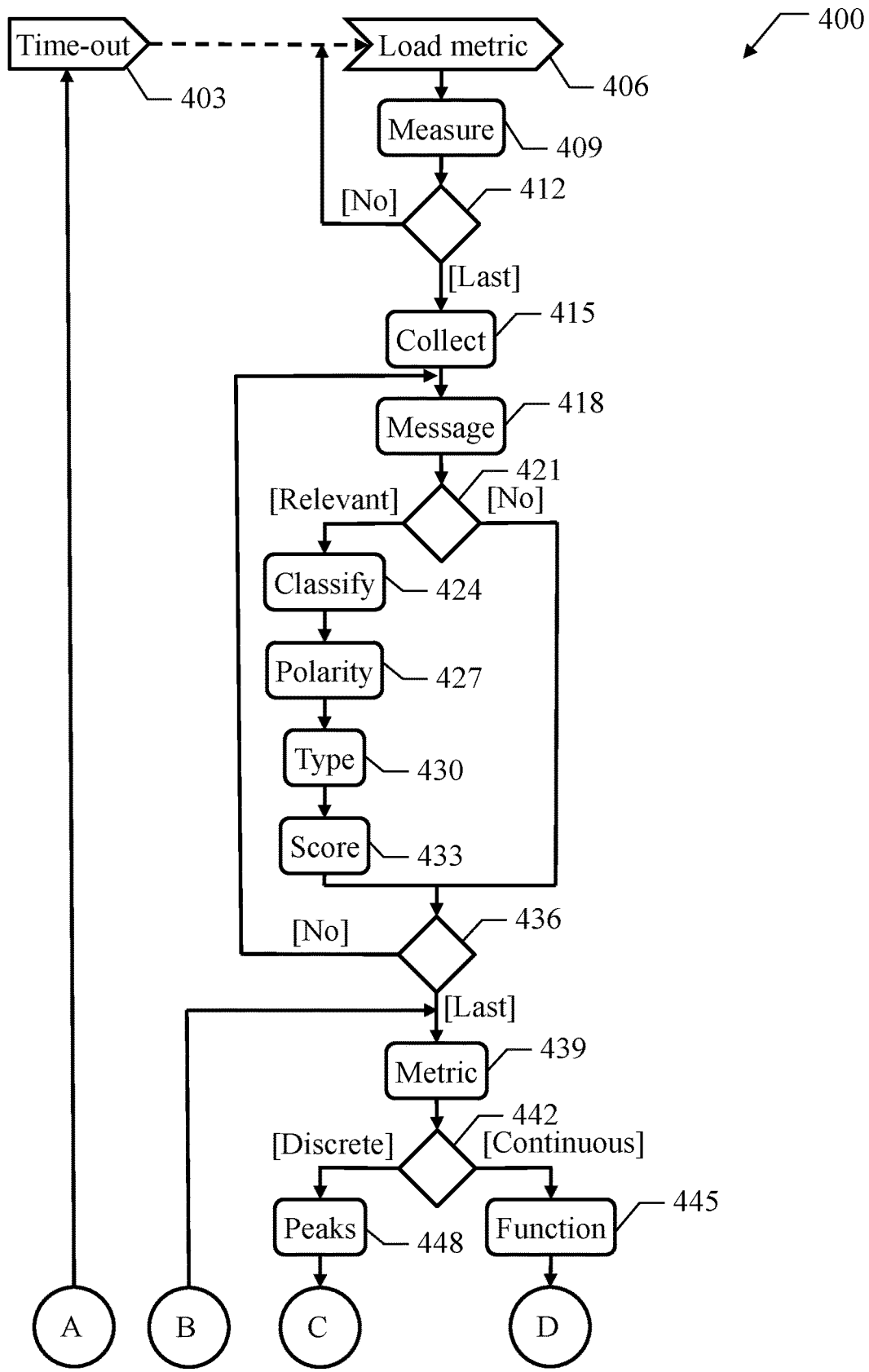
FIGS. 4A-4B show an activity diagram describing the flow of activities relating to an implementation of the solution according to an embodiment of the present disclosure.
Figure 4B:
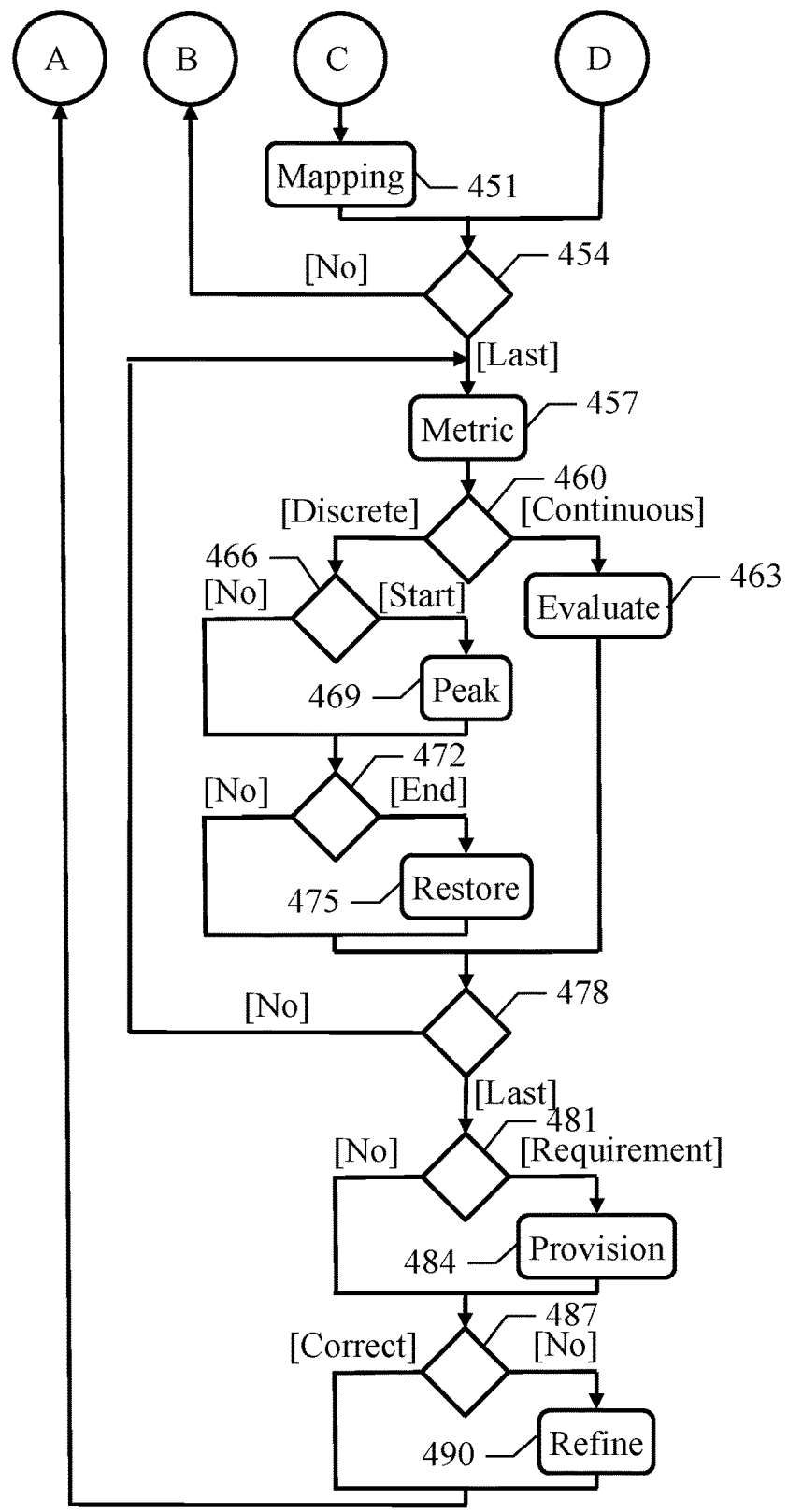

With reference now to FIGS. 4A-4B, an activity diagram is shown describing the flow of activities relating to an implementation of the solution according to an embodiment of the present disclosure.

Particularly, the diagram represents an exemplary process that may be used to manage a generic software application (for optimizing its workload) with a method 400. In this respect, each block may correspond to one or more executable instructions for implementing the specified logical function on the relevant computing machines.

Particularly, a loop implementing a monitoring cycle is performed continuously by passing from block 403 to block 406 as soon as a corresponding time-out expires (for example, every 30-90 minutes). In response thereto, a learning phase is started for populating the load information repository and the social information repository, and then the estimated correlation repository. At this point, the load monitor takes a (current) load metric of the software application into account (starting from a first load metric of a first software module in any arbitrary order, as indicated in the configuration information extracted from the corresponding repository). Continuing to block 409, the load monitor measures this load metric (for example, by exploiting corresponding APIs exposed by hypervisors running on the servers of the cloud provider) and it saves its value into the load information repository, with a First In First Out (FIFO) policy. A test is made at block 412, wherein the load monitor verifies whether a last load metric has been measured. If not, the process returns to the block 406 to repeat the same operations on a next load metric. Conversely (once all the load metrics have been measured), the flow of activity descends into block 415.

At this point, the social scanner collects the (public) social messages that have been shared (in the social network services of interest) after a last execution of the monitoring cycle. The social scanner then takes a (current) social message into account at block 418 (starting from a first one in any arbitrary order). A test is performed at block 421, wherein the social scanner verifies whether the social message relates to the software application. This happens when the social message contains at least one of the corresponding hashtags (as indicated in the configuration information); for example, a social message containing the hashtag # myApplication is recognized as relating to the software application. If so, the process descends into block 424, wherein the social scanner classifies this (relevant) social message, by associating it with the software module relating thereto. Again, this happens when the social message contains at least one of the corresponding hashtags (as indicated in the configuration information); for example, a social message further containing the hashtag # myFunctionl is recognized as relating to the software module implementing this function. Continuing to block 427, the social scanner determines a polarity of the social message (for example, by applying sentiment analysis, or opinion mining, techniques, such as based on computational linguistics). The polarity indicates a (subjective) attitude of an originator of the social message with respect to the corresponding software module (i.e., his/her judgment or evaluation), such has positive or negative. For example, with reference to the relevant function, a social message indicating good qualities, usefulness, intention/suggestion to use or to buy is positive, whereas a social message indicating bad qualities, uselessness, refusal/discouraging to use or to buy is negative. The social scanner then determines a type (or category) of the social message at block 430. For example, it is possible to have a (new) social message that has been submitted (such as tweeted or posted), a (previous) social message that has been forwarded (such as retweeted or shared), or a positive opinion that has been assigned, or flagged, to a social message (such as favorite or like). With reference now to block 433, the social scanner updates the social score of the software module associated with the social message in the social information repository (reset to zero at the beginning of every monitoring cycle); for example, when the social message is positive the social score is incremented by +1 when it has been submitted, by +2 when it has been forwarded and by +3 when it has been flagged as positive, whereas when the social message is negative the social score is decremented by −1 when it has been submitted, by −2 when it has been forwarded and by −3 when it has been flagged as positive. The flow of activity then continues to block 436; the same point is also reached directly from the block 421 if the social message does not relate to the software application. At this point, a test is made wherein the social scanner verifies whether a last social message has been analyzed. If not, the process returns to the block 418 to repeat the same operations on a next social message. Conversely (once all the social messages have been analyzed), the flow of activity descends into block 439.

At this point (after a sufficient number of monitoring cycles have been performed to provide a significant amount of load information and social information, such as 10-50), the correlator determines the estimated correlations. Particularly, the correlator takes a (current) load metric of the software application into account (starting from a first load metric of a first software module in any arbitrary order, as indicated in the configuration information). The flow of activity then branches at block 442 according to the correlation mode of the load metric (as indicated in the correlation rules extracted from the corresponding repository).

In case of continuous correlation mode, the process descends into block 445, wherein the correlator determines a current version of the provisioning function for the load metric (according to the trend in the past of the load metric and of the social score of the corresponding software module); particularly, the provisioning function indicates how the future requirement of the corresponding computing resource changes as the social score changes and the time delay with which this happens. For example, a very simple provisioning function is defined, for each monitoring instant $t_i$ of execution of the monitoring cycle, by:

$$R(t_i + \Delta t) = k \cdot S(t_i) \cdot M(t_i),$$

wherein R( ) is the future requirement, Δt is a time delay (represented in terms of number of monitoring cycles), k is an adjustment factor, S( ) is the social score and M( ) is the load metric; the provisioning function is defined by specific values of the parameters Δt,k, which are determined by best fitting a corresponding model function $M(t_i + \Delta t) = k \cdot S(t_i) \cdot M(t_i)$ to the monitored values of the load metric and of the social score. In this case, the provision function indicates that, when the social score increases or decreases the future requirement of the computing resource increases or decreases, respectively, after the time delay Δt according to its variation and to the adjustment factor k. The correlator saves the estimated correlation (defined by the values of the adjustment factor k and of the time delay Δt) into the estimated correlation repository (by replacing its previous definition).

Referring back to the block 442, in case of discrete correlation mode the process descends into block 448, wherein the correlator identifies any peak condition in the monitored values of the load metric. For example, the peak conditions are detected when the load metric exceeds a threshold value (i.e., it is possibly strictly higher or lower than it according to the nature of the load metric); several threshold values may be provided to define different peak conditions for corresponding intensity ranges of the load metric (such has a first peak condition when the usage of the processing power is comprised between 60% and 70%, a second peak condition when it is comprised between 70% and 80% and a third peak condition when it is higher than 80%). Each peak condition starts when the load metric exceeds its threshold value and ends when the load metric does not exceed its threshold value any longer or it exceeds another threshold value; for each intensity range, a peak value (of a corresponding single peak condition) is defined equal to an average value of the load metric during all its peak conditions. Continuing to block 451, the correlator maps the peak conditions to stirring events in the social score. For example, starting from the simpler case of an intensity range with a single peak condition, the corresponding stirring event is identified by a last (i.e., the closest) significant change in the social score; this happens when the monitored value of the social score exceeds a warning value, such as equal to 2-4 times its average value (i.e., it is possibly strictly higher than it in the case at issue). The stirring event starts when the social score exceeds the warning value and ends when the social score does not exceed the warning value any longer; the stirring event is defined by a stirring value equal to an average value of the social score during it. The mapping of the stirring event to the peak condition is defined by a (start) time delay between the start of the stirring event and the start of the peak condition and by an (end) time delay between the end of the stirring event and the end of the peak condition. Instead, if the intensity range has multiple peak conditions, the same values are determined for each peak conditions thereof; the stirring event and its mapping to the corresponding (single) peak condition (i.e., the stirring value, the start time delay and the end time delay) are then set equal to an average of these values. The correlator saves the estimated correlation (defined by the stirring value of the stirring event and by its mapping to the corresponding peak condition, in turn defined by its peak value, start time delay and end time delay) into the estimated correlation repository (by replacing its previous definition). In this way, the estimated correlations are determined (and then the corresponding future requirements are forecast) at the level of the software modules; this allows provisioning the corresponding computing resources with a high granularity only where it is necessary (with a corresponding saving thereof).

A test is then made at block 454, wherein the correlator verifies whether a last load metric has been processed. If not, the flow of activity returns to the block 439 to repeat the same operations on a next load metric. Conversely (once all the load metrics have been processed), the flow of activity descends into block 457. This completes the learning phase of the monitoring cycle and it starts an operational phase thereof for provisioning the computing resources as required.

At this point, the tuner forecasts the future requirements of the computing resources. Particularly, the tuner takes a (current) load metric of the software application into account (starting from a first load metric of a first software module in any arbitrary order, as indicated in the configuration information). The flow of activity then branches at block 460 according to the correlation mode of the load metric (as indicated by its estimated correlation extracted from the corresponding repository). In case of continuous correlation mode, the process descends into block 463, wherein the tuner directly calculates the future requirement of the computing resource by evaluating the provisioning function (extracted from the estimated correlation repository) on the monitored value of the load metric and of the social score of the corresponding software module. The tuner saves the future requirement, defined by the value of the provisioning function, for the corresponding monitoring instant, defined by the time delay of the provisioning function, into the future requirement repository. Referring back to the block 460, in case of discrete correlation mode the turner at block 466 verifies whether a new stirring event has started; this happens when the social score exceeds (i.e., it is possibly strictly higher in the case at issue) any stirring value if not stirring event was in progress before or when the social score exceeds a stirring value higher than the one of the stirring event that was in progress before. If so, at block 469 the tuner determines the peak condition mapped to the stirring event that has just started (as indicated in the estimated correlation repository). The tuner saves the future requirement, defined by the peak value of the peak condition, for the corresponding monitoring instant, defined by the start time delay of the stirring event, into the future requirement repository. The process then descends into block 472; the same point is also reached directly from the block 466 if no new stirring event has started. At this point, the tuner verifies whether all the stirring events have ended; this happens when a stirring event was in progress before and now the social score does not exceed (i.e., it is not possibly strictly higher in the case at issue) all the stirring values. If so, at block 475 the tuner saves the future requirement, defined by the original value of the computing resource (saved at the beginning), for the corresponding monitoring instant, defined by the end time delay of the stirring event, into the future requirement repository. The process then descends into block 478; the same point is also reached directly from the block 472 (if a stirring event is still in progress or no stirring event was in progress before) and from the block 463. At this point, the tuner verifies whether a last load metric has been processed. If not, the flow of activity returns to the block 457 to repeat the same operations on a next load metric. Conversely (once all the load metrics have been processed), the flow of activity descends into block 481.

At this point, the provisioner verifies whether any future requirement that has been determined beforehand is available (in the future requirement repository) for a next monitoring instant (for example, before it for any increase of the computing resources of after it for any decrease of the computing resources by a safety margin defined by 5-10 monitoring cycles). If so, the process descends into block 484, wherein the provisioner determines the provisioning action corresponding to each one of these future requirements (as indicated in the provisioning rule repository). Particularly, when the future requirement indicates an increased requirement of the corresponding computing resource the provisioning action involves the allocation of an additional amount of the computing resource (to maintain similar performance despite it); conversely, when the future requirement indicates a reduced requirement of the corresponding computing resource the provisioning action involves the release of an exceeding amount of the computing resource (without adversely impacting the performance). The provisioner then applies these provisioning actions on the servers of the cloud provider; in this way, the computing resources that are likely to be required for meeting their future requirements are made available in advance, so as to be ready when it is necessary. Particularly, in the continuous mode the computing resources follow the trend of the corresponding social activities accurately; in the discrete mode, instead, the allocation/release of the computing resources (with the corresponding overhead) is limited to the cases wherein they are strictly necessary. The process then descends into block 487; the same point is also reached directly from the block 481 if no future requirement applies at the moment.

This completes the operational phase of the monitoring cycle and it starts a regulation phase thereof for regulating operation in feedback (after a sufficient transient period). At this point, the correlator verifies whether the currently monitored values of the load metrics are correct (i.e., they fall within an acceptable range thereof). If not, this means that the corresponding provisioning actions (if any) that have been applied beforehand have not been completely effective; in turn, this means that the corresponding estimated requirements that have been forecast, and then the corresponding estimated correlations that have been determined, are not completely accurate (either because the estimated requirements have been too high or too low); in response thereto, the process descends into block 490, wherein the correlator refines the correlations rules accordingly (in the corresponding repository). In any case, the flow of activity returns to the block 403, from either the block 490 or the block 487, waiting for a next expiration of the corresponding time-out.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a software application. However, the software application may be of any type (for example, a booking web site, a software-downloading center, a documentation depot).

In an embodiment, the method comprises monitoring load information indicative of a workload over time of one or more computing resources being used by the software application. However, the computing resources may be in any number and of any type, i.e., any hardware or software resource, either of physical or virtual type (for example, network bandwidth, virtual machines, virtual disks, databases, software tools) and their load information may be represented in any way, i.e., by any number and type of values for each one of them (for example, load metrics indicating availability, consumption, responsiveness, latency, either individually or combined in any way into one or more indexes); moreover, the load information may be monitored in any way (for example, in push or pull mode, either synchronously with a corresponding period or asynchronously only in case of significant changes thereof).

In an embodiment, the method comprises monitoring social information indicative of a social activity over time relating to the software application. However, the social activities may be in any number and of any type, i.e., relating to any interaction among persons (for example, discussions, publications even not in real-time, like in newspapers) and their social information may be represented in any way, i.e., by any number and type of values for each one of them (for example, social metrics indicating intensity of discussions, rumors, trend lines, either individually or combined in any way into one or more social scores); moreover, the social information may be monitored in any way (either the same or different with respect to the load information).

In an embodiment, the method comprises determining an estimated correlation between the monitored load information and the monitored social information. However, the estimated correlations may be of any type (for example, only based on values without taking into account any time delays); moreover, the estimate correlations may be determined in any way (for example, always in the continuous mode, always in the discrete mode, in any combination thereof, or in additional, alternative or different modes, such as by aggregating different events occurring in fast sequence).

In an embodiment, the method comprises forecasting a future requirement of the computing resources for the software application according to the monitored social information and the estimated correlation. However, the future requirements may be of any type (for example, amount of the computing resources, expressed by continuous or discrete values, such as memory space or number of virtual machines, features of the computing resources, such as microprocessor types); moreover, the future requirement may be determined in any way (for example, by taking into account only the values of the social information that have just been monitored or the last two or more last values thereof, their recent trend).

In an embodiment, the future requirement is for use in provisioning the computing resources to the software application accordingly. However, the future requirements of the computing resources may be used in any way; for example, the possibility of simply displaying an indication thereof (for example, on a monitor or a printer) for providing information to a system administrator who may then intervene accordingly in a manual way is not excluded.

In an embodiment, the method comprises provisioning the computing resources to the software application according to the future requirement thereof. However, the computing resources may be provisioned in any way, either completely automatically or upon manual confirmation (for example, only when significant variations occur, as indicated by delta values of the future requirements exceeding corresponding thresholds).

In an embodiment, the software application is accessible through a global communication network. However, the global communication network may be of any type (even non Internet-based); in any case, the possibility of accessing the software application in any other way is not excluded (for example, through a LAN).

In an embodiment, said step of monitoring social information comprises monitoring one or more social network services implemented over the global communication network. However, the social network services may be in any number and of any type (for example, chats, forums, bulletin boards).

In an embodiment, the software application comprises a plurality of software modules. However, the software modules may be in any number and of any type (for example, based on the SOA specification, relating to front-end and back-end modules, middleware software).

In an embodiment, said step of monitoring load information comprises monitoring the load information indicative of the workload over time of one or more of the computing resources being used by each software module. However, the computing resources may be in any number and of any type, and they may be monitored in any way (either the same or different among the software modules and with respect to the whole software application).

In an embodiment, said step of monitoring social information comprises monitoring the social information indicative of the social activity over time relating to each software module. However, the social activities may be in any number and of any type, and they may be monitored in any way (either the same or different among the software modules and with respect to the whole software application).

In an embodiment, said step of determining an estimated correlation comprises determining the estimated correlation between the monitored load information and the monitored social information of each software module. However, the estimated correlations may be of any type and they may be determined in any way (either the same or different among the software modules and with respect to the whole software application).

In an embodiment, said step of forecasting a future requirement comprises forecasting the future requirement of the computing resources for each software module according to the corresponding monitored social information and the corresponding estimated correlation. However, the future requirements may be of any type and they may be determined in any way (either the same or different among the software modules and with respect to the whole software application).

In an embodiment, said step of monitoring social information comprises collecting social messages shared among persons over time. However, the social messages may be of any type, i.e., any information content (for example, new contents, comments to other contents, ratings assigned thereto) that is shared among persons in any way (for example, posted, selected in a form).

In an embodiment, said step of monitoring social information comprises identifying each relevant one of the social messages relating to the software application. However, the relevant social messages may be identified in any way (for example, by natural language processing techniques).

In an embodiment, said step of monitoring social information comprises calculating the social information according to the relevant social messages. However, the social information may be calculated on any basis (for example, the number the relevant social messages, their polarity, their forwarding, the opinions assigned thereto or additional, alternative or different characteristics thereof, such the number of followers, or in any combination thereof) and in any way (for example, according to any linear or non-linear function thereof).

In an embodiment, said step of calculating the social information comprises determining a polarity of each relevant social message indicative of an attitude of an originator of the relevant social message with respect to the software application. However, the polarity may be of any type (for example, neutral, angry, sad, happy) and it may be determined in any way (for example, by text analysis techniques).

In an embodiment, said step of calculating the social information comprises calculating the social information according to the polarities of the relevant social messages. However, the social information may be calculated in any way according to the polarities of the relevant social messages (for example, by scaling them according to a corresponding sentiment strength).

In an embodiment, said step of calculating the social information comprises identifying each relevant social message being forwarded. However, the forwarding may be of any type (for example, when the social message is simply shared with other persons or with the general public, when a comment is attached thereto) and it may be determined in a way, for example, by parsing the social messages for the presence of previous ones.

In an embodiment, said step of calculating the social information comprises calculating the social information according to the forwarding of the relevant social messages. However, the social information may be calculated in any way according to the forwarding of the relevant social messages (for example, by assigning different weights according to the number of persons to which they are forwarded).

In an embodiment, said step of calculating the social information comprises identifying an opinion assigned to each relevant social message. However, the opinion may be of any type (for example, a vote that is simply positive/negative or defined by any other qualitative/quantitative value) and it may be determined in any way (for example, by simply reading it from a corresponding field or by sentiment analysis techniques).

In an embodiment, said step of calculating the social information comprises calculating the social information according to the opinions of the relevant social messages. However, the social information may be calculated in any way according to the opinions of the relevant social messages (for example, by assigning a weight depending on their votes).

In an embodiment, said step of determining an estimated correlation comprises determining a provisioning function expressing the future requirement of each computing resource as a function of corresponding monitored load information and a time delay. However, the provisioning function may be of any type (for example, a spline) and it may be determined in any way (even without any assumption about its type). In any case, the possibility of using the provisioning function only for the cases in which the social information indicates an increase of the corresponding social activity and/or without taking into account the time is not excluded; a possible example of this alternative provisional function is:

$$R(t_i) = k \cdot \min\left(1, \text{round}\left(\frac{s(t_i)}{s(t_i - 1)}\right)\right) \cdot M(t_i - 1),$$

wherein min( ) returns the minimum of its arguments and round( ) rounds its arguments to the smallest integer.

In an embodiment, said step of forecasting a future requirement comprises setting the future requirement of each computing resource according to an evaluation of the corresponding provisioning function on the corresponding monitored load information. However, the future requirement may be set in any way according to the evaluation of the corresponding provisioning function (for example, by applying it in advance with any safety margin, down to immediately).

In an embodiment, said step of determining an estimated correlation comprises identifying one or more peak conditions in the monitored load information. However, the peak conditions may be of any type (for example, defined by any number of any threshold values, down to a single one) and they may be defined in any way (for example, by different peak values, such as set to predefined multiples of their average values or even by the actual trend of their values); moreover, the peak conditions may be determined in any way (for example, by filtering out short spikes, such as when the corresponding threshold values are not exceeded for at least a predetermined number of consecutive monitoring instants).

In an embodiment, said step of determining an estimated correlation comprises determining a mapping between each peak condition and a corresponding stirring event in the monitored social information. However, the mapping may be of any type (for example, taking into account the time delay from both the start and the end of the stirring event, only the one from the end thereof or none) and it may be determined in any way (for example, by filtering out short spikes of the social information, such as when the corresponding warning values are not exceeded for at least a predetermined number of consecutive monitoring instants).

In an embodiment, said step of forecasting a future requirement comprises setting the future requirement of each computing resource according to the corresponding peak condition and restoring the future requirement of the computing resource in response to a start and to an end, respectively, of each stirring event according to the corresponding mapping. However, the future requirement may be set in any way according to the peak condition (for example, so as to follow the trend of its values) in response to the start of the stirring event (for example, by applying it in advance with any safety margin, down to immediately); moreover, the future requirement may be restored in any way (for example, to an average value in a predefined number of monitoring instants before the peak condition) in response to the end of the stirring event (for example, by applying it delayed with any safety margin, down to none).

In an embodiment, the method comprises refining the corresponding estimated correlation according to the monitored load information corresponding to each future requirement. However, the estimated correlation may be refined in any way (for example, by fuzzy logic techniques) according to the load information corresponding to the future requirements (for example, only after any number of the load metrics is not correct in any number of monitoring instants).

In an embodiment, the computing resources are cloud services provided in a cloud computing environment. However, the cloud services may be of any type (for example, infrastructures, platforms, software, connectivity or any combination thereof) in any cloud computing environment (for example, public, private, hybrid); in any case, the possibility of applying the same technique described above in a classic computing environment (for example, of the client-server type) is not excluded.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the software program may be implemented as a stand-alone module, as a plug-in for a pre-existing software program (for example, a cloud manager), or even directly in the latter; moreover, the software program may run on any computing system (see below) and it may be also deploy as a service that is accessed through the communication network. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each one of the steps of the above-mentioned method. An embodiment provides a system comprising a circuitry (i.e., any hardware suitably configured, for example, by software) configured for performing each one of the steps of the same method. However, the system may be of any type (for example, a dedicated server or one of the servers of the software application).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of these features may be the following: claim 2 with claim 1, claim 3 with claim 1 or 2, claim 4 with any claim from 1 to 3, claim 5 with any claim from 1 to 4, claim 6 with claim 5, claim 7 with claim 5 or 6, claim 8 with any claim from 5 to 7, claim 9 with any claim from 1 to 8, claim 10 with any claim from 1 to 9, claim 11 with any claim from 1 to 10, claim 12 with any claim from 1 to 11, claim 13 with instructions for performing the method of any claim from 1 to 12, and claim 14 with means (or a circuitry) for performing each step of any claim from 1 to 12.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for managing a software application, the method comprising:
    monitoring load information of each software module of the software application indicative of a workload over time of one or more computing resources being used by the software application;
    monitoring social information indicative of a social activity over time relating to the software application;
    determining an estimated correlation between the monitored load information and the monitored social information;
    forecasting a future requirement of the computing resources for the software application according to the monitored social information and the estimated correlation for use in provisioning the computing resources to the software application accordingly; and
    provisioning the computing resources to the software application according to the future requirement thereof;
    wherein said monitoring social information comprises:
        collecting social messages shared among persons over time;
        identifying each relevant one of the social messages relating to the software application;
        determining a polarity of each relevant social message indicative of an attitude of an originator of the relevant social message with respect to the software application;
        identifying each relevant social message being forwarded;
        identifying an opinion assigned to each relevant social message; and
        calculating the social information according to the relevant social messages, the polarities of the relevant social messages, the forwarding of the relevant social messages, and the opinions of the relevant social messages; and
    wherein said determining the estimated correlation comprises:
        identifying one or more peak conditions in the monitored load information; and
        determining a mapping between each peak condition and a corresponding stirring event in the monitored social information,
        and said forecasting the future requirement comprises:
            setting the future requirement of each computing resource according to the corresponding peak condition and restoring the future requirement of the computing resource in response to a start and to an end, respectively, of each stirring event according to the corresponding mapping.

2. The method as recited in claim 1, wherein the computing resources are cloud services provided in a cloud computing environment.

3. The method as recited in claim 1, wherein the software application is accessible through a global communication network, said monitoring social information comprising:
   monitoring one or more social network services implemented over the global communication network.

4. The method as recited in claim 1, wherein the software application comprises a plurality of software modules, said monitoring load information comprising:
   monitoring the load information indicative of the workload over time of one or more of the computing resources being used by each software module,
   said monitoring social information comprising:
   monitoring the social information indicative of the social activity over time relating to each software module,
   said determining the estimated correlation comprising:
   determining the estimated correlation between the monitored load information and the monitored social information of each software module, and
   said forecasting the future requirement comprising:
   forecasting the future requirement of the computing resources for each software module according to the corresponding monitored social information and the corresponding estimated correlation.

5. The method as recited in claim 4 further comprising:
   refining the corresponding estimated correlation according to the monitored load information corresponding to each future requirement.

6. The method as recited in claim 5, wherein the corresponding estimated correlation is refined using a fuzzy logic technique.

7. The method as recited in claim 2, wherein the cloud services comprise one or more of the following: infrastructure, platform, software, and connectivity.

8. The method as recited in claim 1 further comprising:
   using correlation rules for determining the estimated correlation between the monitored load information and the monitored social information, wherein each correlation rule of the correlation rules indicates how to calculate a provisioning function from a social score.

9. The method as recited in claim 1, wherein the social messages comprise comments to other contents, ratings assigned thereto, and new contents.

10. The method as recited in claim 1 further comprising:
   identifying each relevant one of the social messages relating to the software application using natural language processing.

* * * * *